United States Patent
Taylor et al.

(10) Patent No.: US 11,665,098 B2
(45) Date of Patent: May 30, 2023

(54) PROCESSING USER TRAFFIC IN A VIRTUALISED NETWORK

(71) Applicant: METASWITCH NETWORKS LTD., Enfield (GB)

(72) Inventors: Martin Taylor, Faringdon (GB); James Robert Andrew, Harrow (GB); Matthew Ian Ronald Williams, London (GB)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

(21) Appl. No.: 17/243,169

(22) Filed: Apr. 28, 2021

(65) Prior Publication Data

US 2021/0344606 A1 Nov. 4, 2021

Related U.S. Application Data

(60) Provisional application No. 63/017,939, filed on Apr. 30, 2020.

(51) Int. Cl.
*H04L 47/2441* (2022.01)
*H04L 47/10* (2022.01)
(Continued)

(52) U.S. Cl.
CPC .......... *H04L 47/2441* (2013.01); *H04L 47/15* (2013.01); *H04L 47/22* (2013.01); *H04L 47/2483* (2013.01)

(58) Field of Classification Search
CPC ..... H04L 47/2441; H04L 47/15; H04L 47/22; H04L 47/2483; H04L 49/70;
(Continued)

(56) References Cited

U.S. PATENT DOCUMENTS

2017/0168985 A1* 6/2017 Hwang ............... H04L 67/1097
2019/0124013 A1* 4/2019 Murugesan ............ H04L 45/38
(Continued)

FOREIGN PATENT DOCUMENTS

| EP | 3487129 A1 | 5/2019 |
| GB | 2559660 A | 8/2018 |
| WO | 2018174759 A1 | 9/2018 |

OTHER PUBLICATIONS

"International Search Report and Written Opinion Issued in PCT Application No. PCT/US21/029761", dated Aug. 18, 2021, 14 Pages.
(Continued)

*Primary Examiner* — Jung H Park
(74) *Attorney, Agent, or Firm* — Han Gim; Newport IP, LLC

(57) ABSTRACT

User traffic is processed in a virtualised network. First and second VNFs are initialised in the same network namespace as each other in user space in a host and have access to a shared memory region of the host. The first VNF processes user traffic and the second VNF provides a user plane service in relation to user traffic processed by the first VNF. The first VNF is used to establish a point-to-point, shared-memory interface between the first and second VNFs and is used to classify incoming user traffic. In response to the first VNF determining based on the classifying, that the incoming user traffic is to be subject to the user plane service, the first VNF is used to store the incoming user traffic in the shared memory region of the host to enable the second VNF to provide the user plane service in relation to the incoming trier traffic.

20 Claims, 5 Drawing Sheets

(51) Int. Cl.
*H04L 47/22* (2022.01)
*H04L 47/2483* (2022.01)

(58) Field of Classification Search
CPC ............... H04L 45/122; H04L 45/306; H04L 41/5041; G06F 9/455; G06F 2009/45583
See application file for complete search history.

(56) References Cited

U.S. PATENT DOCUMENTS

| | | |
|---|---|---|
| 2019/0327177 A1 | 10/2019 | Murugesan et al. |
| 2020/0007460 A1* | 1/2020 | Guim Bernat ......... G06F 9/5072 |
| 2020/0162370 A1* | 5/2020 | Song ..................... H04L 45/306 |
| 2021/0218750 A1* | 7/2021 | Wells .................... H04L 63/083 |
| 2021/0297347 A1* | 9/2021 | Xu ....................... H04L 41/0806 |

OTHER PUBLICATIONS

Xiang, et al., "Reducing Latency in Virtual Machines: Enabling Tactile Internet for Human-Machine Co-Working", In IEEE Journal on Selected Areas in Communications, vol. 37, Issue 5, May 2019, pp. 1098-1116.
"Office Action and Search Report Issued in United Kingdom Patent Application No. 2014559.5", dated Oct. 30, 2020, 5 Pages.
"Notice of Allowance Issued in United Kingdom Patent Application No. 2014559.5", dated Jul. 8, 2022, 2 Pages.
"Office Action Issued in European Patent Application No. 21726018.1", dated Dec. 12, 2022, 2 Pages.

* cited by examiner

PROCESSING USER TRAFFIC IN A VIRTUALISED NETWORK

PRIORITY APPLICATION

This application claims the benefit of and priority to U.S. Provisional Application No. 63/017,939, filed Apr. 30, 2020, the entire contents of which are incorporated herein by reference.

TECHNICAL FIELD

The present disclosure relates to processing user traffic in a virtualised network.

BACKGROUND 5G networks have a control plane for session management, authorisation, mobility, policy, and charging and a user plane (also known as a "data plane") for passing user traffic. User traffic may comprise Internet Protocol (IP) or Ethernet traffic, or may comprise unstructured traffic (for example, arbitrary Layer 2 (L2) data), going from a user to the wider Internet or another network. A network operator may want to extend the processing performed on the user plane. A User Plane Function (UPF), which is a user-traffic-handling 5G network component, could be extended to provide such user plane processing capabilities. However, this would involve the UPF vendor implementing such functionality, which may be heavily optimised for a specific use-case, in the UPF for a requester. In practice, this can limit the choice of product or functionality available to the requester. Alternatively, such processing capabilities can be provided by implementing one or more Service Functions (SFs), which are separate to the UPF and which the UPF routes traffic through in a chain. This is known as Service Function Chaining (SFC), an architecture for which is defined in RFC 7665.

Modem data plane applications (for example, 5G UPFs) process very high-bandwidth user traffic and rely on minimal latency. In networks handling such extreme levels of traffic, the hardware resources (for example, Central Processing Unit (CPU) resources) involved, and latency introduced by traversing between multiple SFs using known methods, such as forwarding between Virtual Machines (VMs) on different hosts would be unacceptable. The most efficient way to apply SFs to a packet flow is to minimise the number of operations performed on the packet by handling the packet in a single application provided by a single vendor, such as a single UPF extended to provide the above-mentioned processing capabilities. However, handling the packet in a single-vendor, extended UPF can preclude the use of third-party SFs, in other words SFs provided by a vendor other than the vendor of the UPF, where the above-mentioned processing capabilities are provided in the UPF itself.

SUMMARY

According to first embodiments, there is provided a method of processing user traffic in a virtualised network, the method comprising:
instantiating first and second virtualised network functions (VNFs) in the same network namespace as each other in user space in a host, the first VNF being arranged to process user traffic and the second VNF being arranged to provide a user plane service in relation to user traffic processed by the first VNF; and
using the first VNF to:
establish a point-to-point, shared-memory interface between the first and second VNFs, wherein the first and second VNFs both have access to a shared memory region of the host;
classify incoming user traffic; and
in response to the first VNF determining, based on the classifying, that the incoming user traffic is to be subject to the user plane service provided by the second VNF, store the incoming user traffic in the shared memory region of the host to enable the second VNF to provide the user plane service in relation to the incoming user traffic.

According to second embodiments, there is provided n method of processing user traffic in a virtualised network, the method comprising:
instantiating first second and third user plane functions in the same network namespace as each other in user space in a host, the first, second and third user plane functions having access to a shared memory region of the host;
establishing a first point-to-point, shared-memory interface between the first and second user plane functions;
establishing a second point-to-point, shared-memory interface between the first and third user plane functions;
using the first user plane function to transmit first control data, relating to user traffic in the shared memory region, to the second user plane function; and
using the first user plane function to transmit second control data, relating to user traffic in the shared memory region, to the third user plane function.

According to third embodiments, there is provided a method of processing user traffic in a virtualised network, the method comprising:
instantiating a UPF and at least one further network function in the same network namespace as each other in a host, the UPF and the at least one further network function both having access to a shared memory region of the host; and
using the UPF to:
establish at least one virtio interface with the at least one further network function;
process received user traffic;
store the processed, received user traffic in the shared memory region of the host; and
transmit control data associated with the received user traffic to at least one further network function,
wherein the at least one further network function comprises SF and/or MEC functionality.

According to fourth embodiments, there is provided a virtualised network arranged to perform a method according to any of the first through third embodiments.

According to fifth embodiments, there is provided a lion-transitory computer-readable medium comprising computer-readable instructions for causing a method of processing user traffic in a virtualised network to be performed, the method being according to any of the first through third embodiments.

Further features and advantages will become apparent from the following description, given by way of example only, which is made with reference to the accompanying drawings.

DETAILED DESCRIPTION

Figure 1:
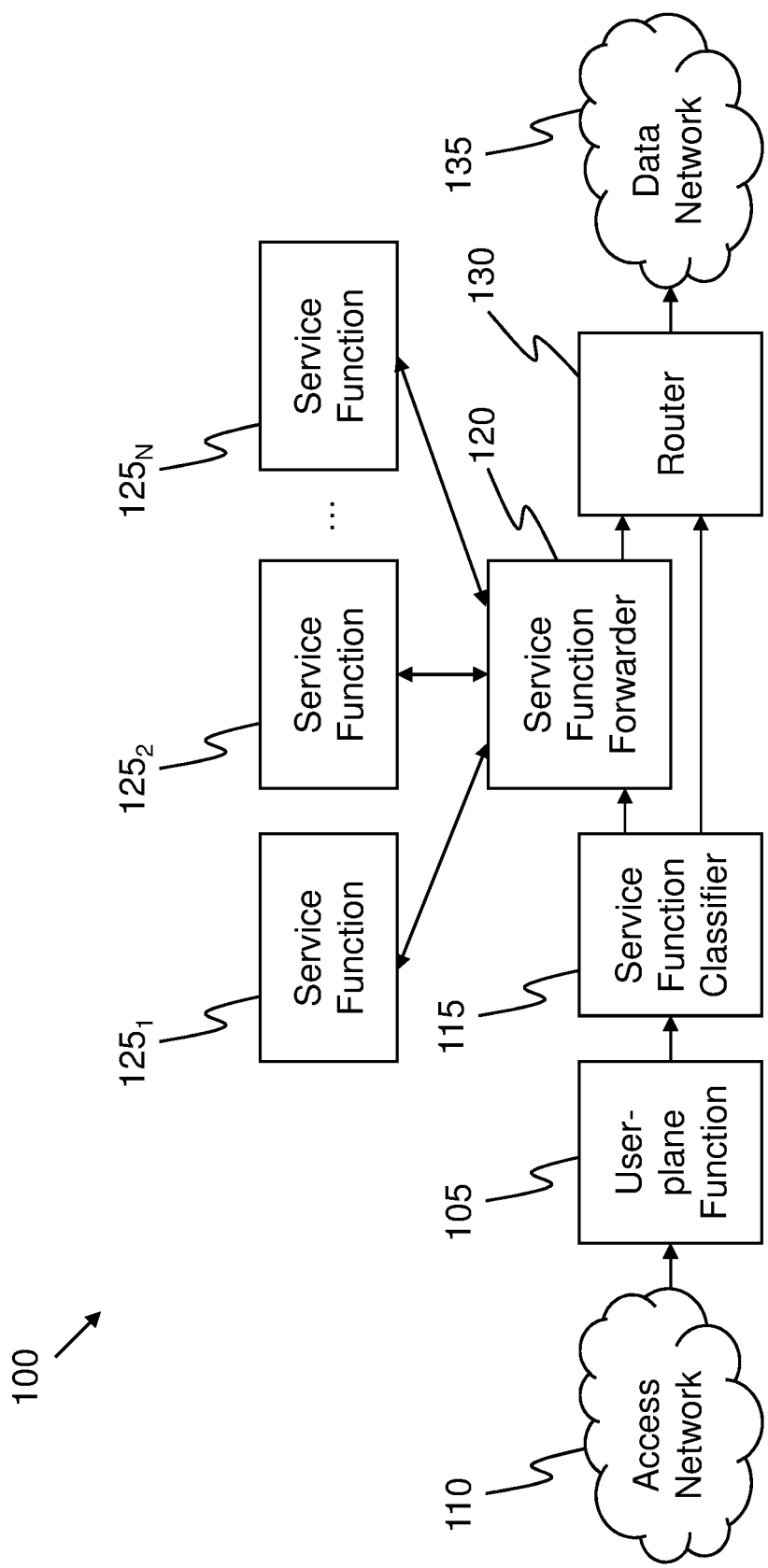
FIG. 1 shows a schematic block diagram representing an example of a network.

Referring to FIG. 1, there is shown an example of a network 100 having an SFC architecture.

A UPF 105 receives incoming packets from an access network 110 and passes the received, incoming packets to a Service Function Classifier (SFC) 115. The SFC 115 classifies the incoming packets. In accordance with RFC 7665, performing such classification may involve locally instantiated matching of traffic flows against policy (which may be customer-, network-, or service-specific) for subsequent application of a set of network service functions.

Packets identified by the SFC 115 as being for SFC processing are encapsulated and forwarded using a Service Function Forwarder (SFF) 120. The SFF 120 is responsible for forwarding packets to a chain of SFs $125_1$, $125_2$, $125_N$ using the information in the encapsulation. The SFF 120 may load-balance user traffic across some or all of the SFs $125_1$, $125_2$, $125_N$. Packets are forwarded over tunnels to each of the SFs $125_1$, $125_2$, $125_N$ that are to be invoked in turn.

Packets are then passed to a router 130 for onward transmission to a data network 135.

Traffic received by the UPF 105 from the data network 135 may also be subject to the same or similar service function processing.

The SFF 120 is genetically a separate network function from the UPF 105 and the SFs $125_1$, $125_2$, $125_N$. Transport between the SFF 120 and the SFs $125_1$, $125_2$, $125_N$ is achieved using a conventional overlay network. In practice, this is analogous to basic L2 forwarding, in other words Ethernet forwarding. In this respect, each SF $125_1$, $125_2$, $125_N$ is a separate hop on the path of a packet traversing the SFC. The hardware resources involved in achieving sufficient bandwidth are significant, and the latency introduced by having multiple SFs $125_1$, $125_2$, $125_N$ is significant for any low-latency system, such as edge cloud networking, or high-bandwidth data plane applications as described herein.

One available technique is fast user space networking, where considerable optimisation is applied to networking applications to increase throughput and decrease latency. One major source of such optimisation is removing kernel-space network protocol handling of packets, instead using a heavily optimised user space implementation. Commonly, Data Plane Development Kit (DPDK) is used for such fast networking. DPDK provides support for many different types of interfaces. One class of interface uses an area of shared memory as foe transport for packets. Applications using this interface pass control messages over a specific interface (which may be referred to as a "control interface", a "communication channel", a "control plane", or a "control channel") and write packets into and/or out of the area of shared memory. This provides significantly faster packet-handling capabilities than serialising to and/or from the wire, or using kernel-backed interfaces.

Figure 2:
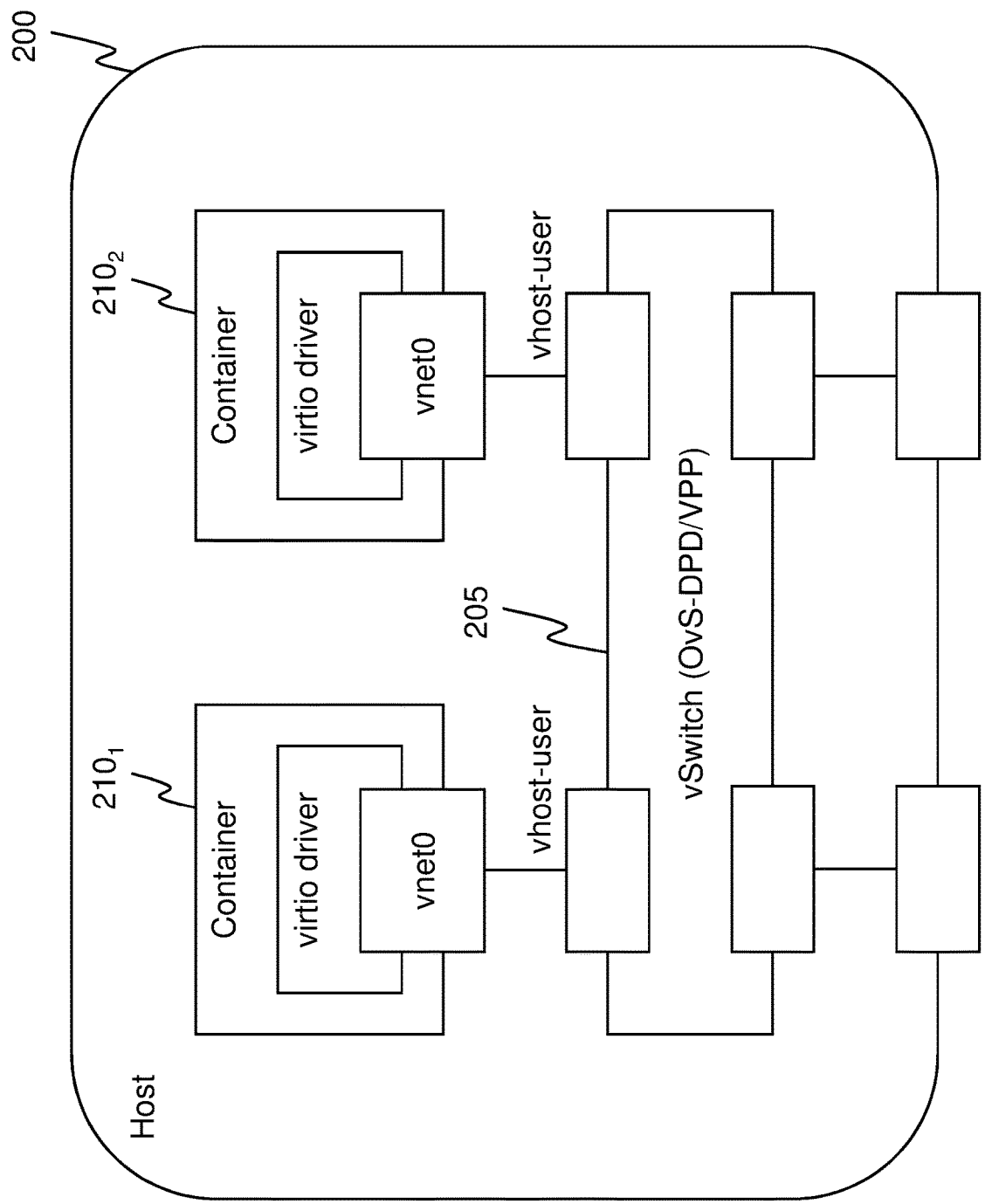
FIG. 2 shows a schematic block diagram representing an example of a host.

Referring to FIG. 2, there is shown an example of a host 200.

A virtual switch (vSwitch) 203 is created on the host 200. vSwitches are Network Functions Virtualisation Infrastructure (NFVI) components, used to provide connectivity between different guests, for example containers or VMs. First and second guests $210_1$, $210_2$ are instantiated on the host 200. In this example, the first and second guests $210_1$, $210_2$ are in the form of first and second containers $210_1$, $210_2$. Each guest $210_1$, $210_2$ is connected to the vSwitch 205 on instantiation. The vSwitch 205 may support providing various interface types to the guests $210_1$, $210_2$. In this example, the interface type is Kernel Virtual Machine (KVM) virtio. Virtio is a standard for networking drivers specifically targeting virtualisation. A guest $210_1$, $210_2$ using a virtio interface is aware that it is running in a virtual environment and cooperates with the hypervisor that backs the virtio interface. The hypervisor technology which backs virtio interfaces is called "vhost" or "vhost-net". The vhost protocol defines how the hypervisor communicates with the guests $210_1$, $210_2$ to manage a shared-memory interface between them.

In this example, the vSwitch 205 is an Accelerated vSwitch (AVS), such as Open-vSwitch-DPDK or Vector Packet Processor (VPP). The AVS 205 implements vhost-user technology. This is an entirely user space implementation of the KVM vhost protocol, which allows the AVS 205 to provide a virtio interface to the guests $210_1$, $210_2$ within user space. The guests $210_1$, $210_2$ may then interact with the AVS 205 as if the AVS 205 were the KVM hypervisor. While originally targeted at VMs, AVSs have been extended to containers, where an AVS is run on a host and Kubernetes Container Networking Interface (CNI) plugins are used to manage the connection between the AVS and the containers, inserting the virtio interface into the network namespace of the appropriate Pod or container. However, virtualised networking which uses an AVS still incurs a packet-handling cost to transit from one guest to another. A packet has two hops: from a source guest to an AVS, and then from the AVS to a destination guest. This incurs a time and processing penalty, albeit with the additional flexibility that packets can be forwarded between any guests connected to the AVS.

As such, in this example, the AVS 205 is used to provide accelerated, inter-container networking between containers $210_1$, $210_2$ which are co-located on the same host 200.

Figure 3:
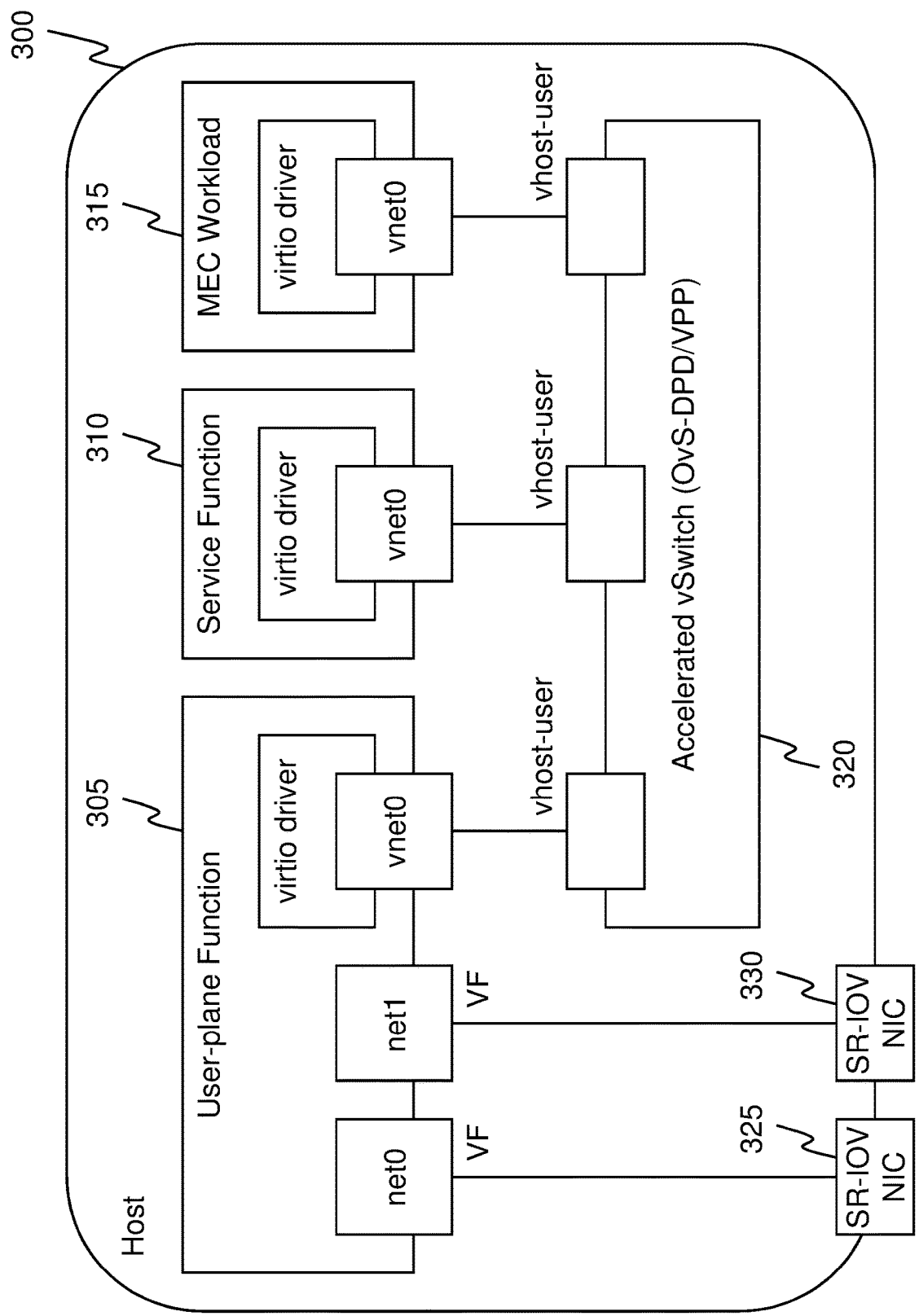
FIG. 3 shows a schematic block diagram representing another example of a host.

Referring to FIG. 3, there is shown an example of a host 300. In this example, an accelerated container networking setup is provided using a vSwitch.

In this example, a UPF 305, an SF 310 and a Mobile Edge Compute (MEC) workload 315 are instantiated in user space on the host 300. The MEC workload 315 can provide various user plane services, such as analytics, edge video caching, etc. An AVS 320 is also created. In this example, user plane packets which receive some SF handling traverse the following nodes; ingress single-root input/output virtualisation (SR-IOV) network interlace controller (NIC) 325, UPF 305, AVS 320, SF 310, AVS 302, UPF 305, and egress SR-IOV NIC 330. As such, there are four hops for user plane packets to traverse from the UPF 305 to the SF 310 and hack, via the AVS 320. In this example, the first, ingress SR-IOV NIC 325 represents a connection to the access network (110: FIG. 1) and the second, egress SR-IOV NIC 330 represents a connection to the router and/or or the data network (130, 135; FIG. 1).

In this example, although the AVS 320 has respective shared-memory interfaces with the UPF 305, the SF 310 and the MEC workload 315, each of the shared-memory interfaces uses a different, respective shared memory. For example, although the UPF 305 and AVS 320 have access to a shared memory region of the host 300, the AVS 320 and the SF 310 have access to a different shared memory region of the host 300. As such, for user traffic to traverse from the UPF 305 to the AVS 320 and then from the AVS 320 to the SF 310, the user traffic would need to be copied from a first shared memory region used by the UPF 305 and the AVS 320 to a second, different shared memory region used by the AVS 320 and the SF 310.

Figure 4:
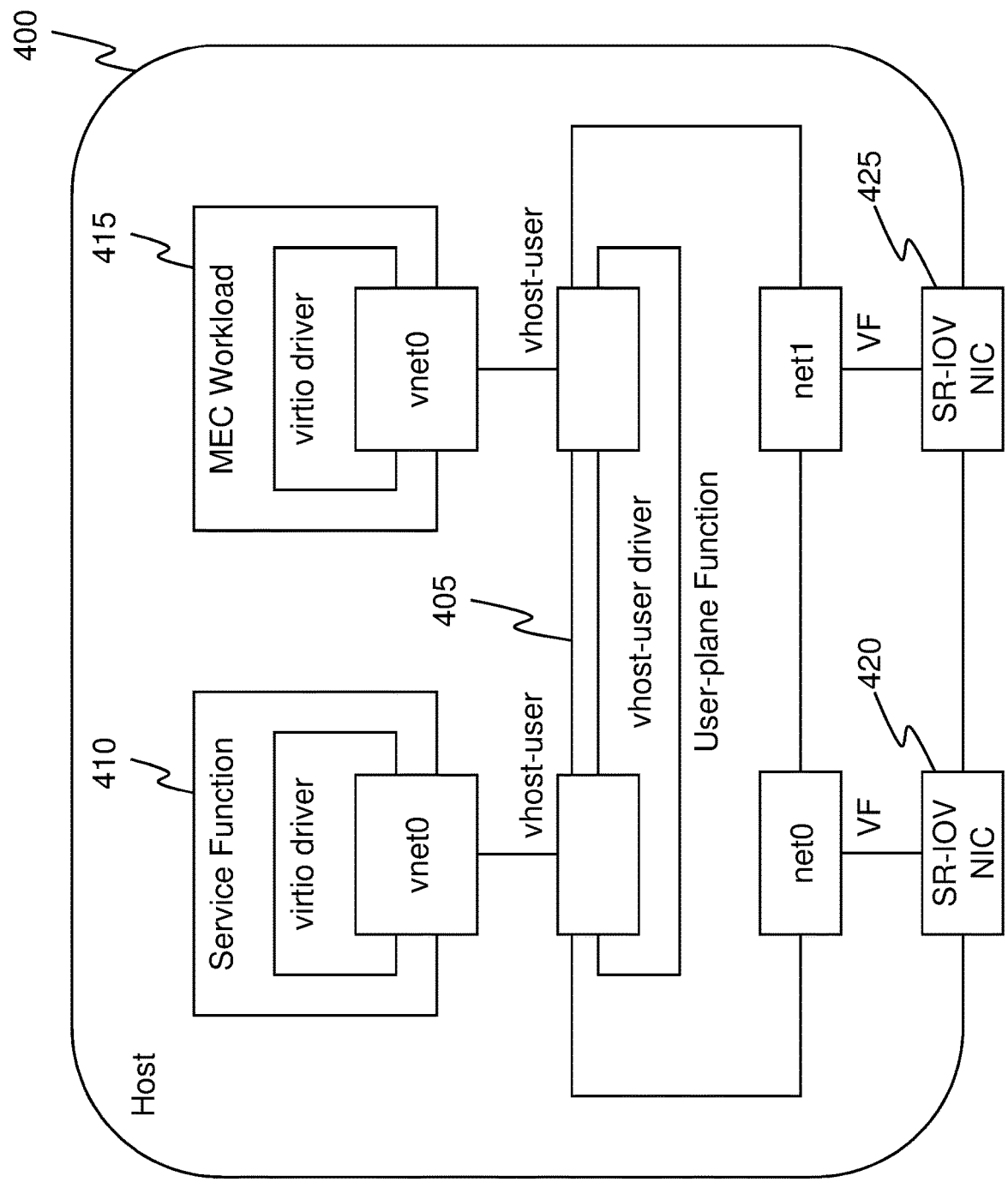
FIG. 4 shows a schematic block diagram representing another example of a host.

Referring to FIG. 4, there is shown an example of a host 400. In this example, accelerated networking is provided using point-to-point, shared memory interfaces.

Shared memory enables data to be written once, then accessed by multiple readers (for example, guests). This provides a rapid and reliable way of passing information, since the information itself does not have to be transmitted; rather the location of the memory where the information can be accessed is transmitted as control data, for example as part of a start-of-day setup. Shared memory exists within programs, where specific data can be transferred around the program in this manner.

In this example, shared memory is applied to a virtual network. For example, one container writes data to memory, and another container reads that memory. Shared memory only works for guests on the same host as each other, since the memory they both access is a shared physical resource that is co-located with the accessing program. In addition, a level of collaboration exists between the two processes, alongside communication with each other to manage access to the area of shared memory to prevent memory safety issues, such as write-collisions, torn reads etc.

In this example, rather than a UPF product from a single vendor encapsulating SF functionality, all the SFs the UPF may invoke are deployed in containers on the same host as each other, and use a shared-memory-based forwarding technique. Such a technique may readily integrate with third-party SFs which may, for example, have highly optimised functionality for specific user plane services. More specifically, this example, can enable fast SFC using vhost-user interfaces.

Latency and packet-handling overhead between two SFs may be minimised by using a point-to-point, shared-memory interface directly between a pair of containers on the same host. By using vhost-user/virtio as the shared-memory interface, there is negligible integration overhead when interfacing with third-party SFs owing to the ubiquity of virtio in existing virtualisation.

A source application (in this example, a 5G UPF) and a target SF are instantiated in the same network namespace as each other, which in this example involves them being in the same Kubernetes Pod as each other. Instantiating the source application and the target SF in the same network namespace provides workload isolation. The UPF includes support for vhost-user. In advance of communicating with the target SF (for example, at start-of-day), the UPF initialises the vhost-user driver, thereby creating a virtio interface in the network namespace of tire target SF. The target SF can then bind to the virtio interface, as it would under conventional accelerated VM/container networking. However, the target SF binds with a virtio interface of the UPF instead of with a virtio interface of a vSwitch.

The use of the point-to-point, shared-memory interface involves careful consideration of orchestration. The target SF is tied to the lifetime of the UPF and shares the same host and network namespace as the UPF. In view of the limitations and considerations around orchestration in the case of shared memory, as is used in this example, the present example is particularly effective for, and targets, the specific use-case of extremely low-latency and high-band width packet handling, where the overhead of an additional hop to a vSwitch between each SF is notably detrimental to performance of the overall system. One particular example of such a scenario is user plane SFs placed in the path of packet flows between mobile networks and the internet. Another particular example is offload of packet flows to a Mobile Edge Compute (MEC) application.

Returning now to FIG. 4, a UPF 405, an SF 410 and a MEC workload 415 are instantiated on the host 400. The UPF 405 itself implements a point-to-point, shared-memory interface, which in this example is a vhost-user/virtio interface. This contrasts with implementing a vSwitch into the network and interfacing with the vSwitch. Since the UPF 405 implements a vSwitch-like interface (in this example, a vhost-user/virtio point-to-point interface) and since SFs, such as the SF 410, can interact with vSwitches, the UPF 405 can interoperate with SFs whilst benefiting from the speed expected of a vSwitch interface. However, it will be appreciated that the UPF 405 is not a vSwitch which, as explained above, is an NFVI component.

In this example, using a point-to-point, shared-memory technique, user plane packets which receive some SF handling traverse the following nodes: ingress SR-IOV NIC 420, UPF 405, SF 410, UPF 405, and egress SR-IOV NIC 425. As such, there are only two hops for user plane packets to traverse from the UPF 405 to the SF 410 and back, compared to four hops in the example host 300 described above with reference to FIG. 3. In addition, since the UPF 405 and the SF 410 use the shared-memory interface, user traffic does not need to be copied from one memory region to another as the user traffic traverses from the UPF 405 to the SF 410 and back. In contrast, in the example host 300 described above with reference to FIG. 3, user traffic is copied between different memory regions.

In more detail, an SR-IOV NIC physical function (PF) may represent NIC hardware as a Peripheral Component Interconnect Express (PCI-e) device. This may be separated into multiple virtual functions (VFs), each of which may have a separate PCI-e configuration space and may be backed by shared hardware resources on the NIC. The VF may be provided to a guest; in this example, the UPF 405. In startup, the UPF 405 (in this example, a DPDK application) may initialise a large, contiguous portion of memory (in this example, a HugePage). When binding the VF, the UPF 405 may provide a portion of the HugePage memory to the VF driver. This portion of memory may be initialised into a receive (RX) queue and transmit (TX) queue. Both the UPF 405 and the VF may access tire memory to read and write packets from and into the RX and TX queues.

When a packet is received on an SR-IOV NIC (for example, the ingress SR-IOV NIC 420), the packet may be stored in a hardware queue on the NIC. After determining which VF the packet is destined for, the NIC may then use direct memory access (DMA) to write the packet into that shared RX queue, initialised earlier by the UPF 405.

In the case of the UPF 405, during a processing loop performed by the UPF 405, a DPDK poll mode driver may poll the VF to see if any data is available in the RX queue. If so, DPDK may populate a packet buffer data structure for each received packet, which may contain packet metadata (such as packet length) and a pointer to the location in the RX queue where the VF wrote the packet.

At this stage, the NIC may have only written the packet from its hardware directly into memory accessible by the UPF 405.

At this point, the UPF 405 may classify the packet as not requiring SFC. In this case, the UPF 405 may apply manipulations to the packet in-place and prepare to transmit the packet. This may involve copying the packet from the RX queue allocated to the ingress VF to the TX queue allocated to the egress VF. The UPF 405 may then inform the egress VF that a packet in its TX queue is ready for transmission, and the VF may use DMA to read that packet into its hardware for transmission.

Alternatively, the UPF 405 may classify the packet as requiring SFC. In this case, the UPF 405 may perform manipulation on the packet, copy the packet into the area of shared memory owned by the vhost-user driver and inform the SF 410 via the vhost/virtio control channel that a packet is available for processing by the SF 410. After the co-requisite processing in the SF 410, the vhost-user driver of the UPF 405 may either poll or be informed of an incoming packet front the SF 410. The UPF 405 may then apply further manipulation to the packet in-place, before preparing to transmit the packet, as described above.

The packet may be copied in an intermediate stage between the initial DMA write into the RX queue and the handling of the packet by the DPDK application (in this example, the UPF 405). For example, in the non SFC case, instead of the packet going from the ingress VF to the RX queue using DMA and then from the TX queue to the egress VF using DMA, the packet may go from rite ingress VF to the RX queue using DMA, then to an intermediate processing buffer, then from the intermediate processing buffer to the TX queue, and then from the TX queue to the egress VF using DMA. A similar intermediate processing buffer may be used when SFC is to be applied, when using the vhost-user driver.

The architecture shown in FIG. 4 allows a significant reduction in latency and packet-handling overhead between SFs compared to existing SFF architectures, such as described above with reference to FIGS. 2 and 3. There is no copy operation in the handoff between one guest (the UPF 405 in this example) and its peer(s) (the SF 410 and the MEC workload 415 in this example), since they all share the same memory region. This allows minimal latency operation by reducing the time and computational cost of the copy operation, allowing the traffic-processing performed in the host 400 to stay as close as possible to the ideal of touching each packet only once. In this regard, unwrapping a packet fewer times results in a reduced number of CPU cycles and hence reduced hardware resource usage. By using vhost-user technology, integrating a third-party SF is no more complex than in an existing deployment of the SF, excepting the additional complexity in orchestration as described above. Peer guests (the SF 410 and the MEC workload 415 in this example) are provided with virtio interfaces, which are well-supported for fast VNFs. Therefore, no enhancements to a conventional SF may be needed to use this networking technique.

The node 400 may thereby be used to process user traffic in a virtualised network. The UPF 405 and at least one further network function (in this example both the SF 410 and the MEC workload 415) are instantiated in the same network namespace as each other in the host 400. The UPF 405 and the at least one further network function both have access to a shared memory region of the host 400. The UPF 405 is used to: establish at least one virtio interface with the at least one further network function; to process received user traffic; to store the processed, received user traffic in the shared memory region of the host 400; and to transmit control data associated with the received user traffic to the at least one further network function.

Figure 5:
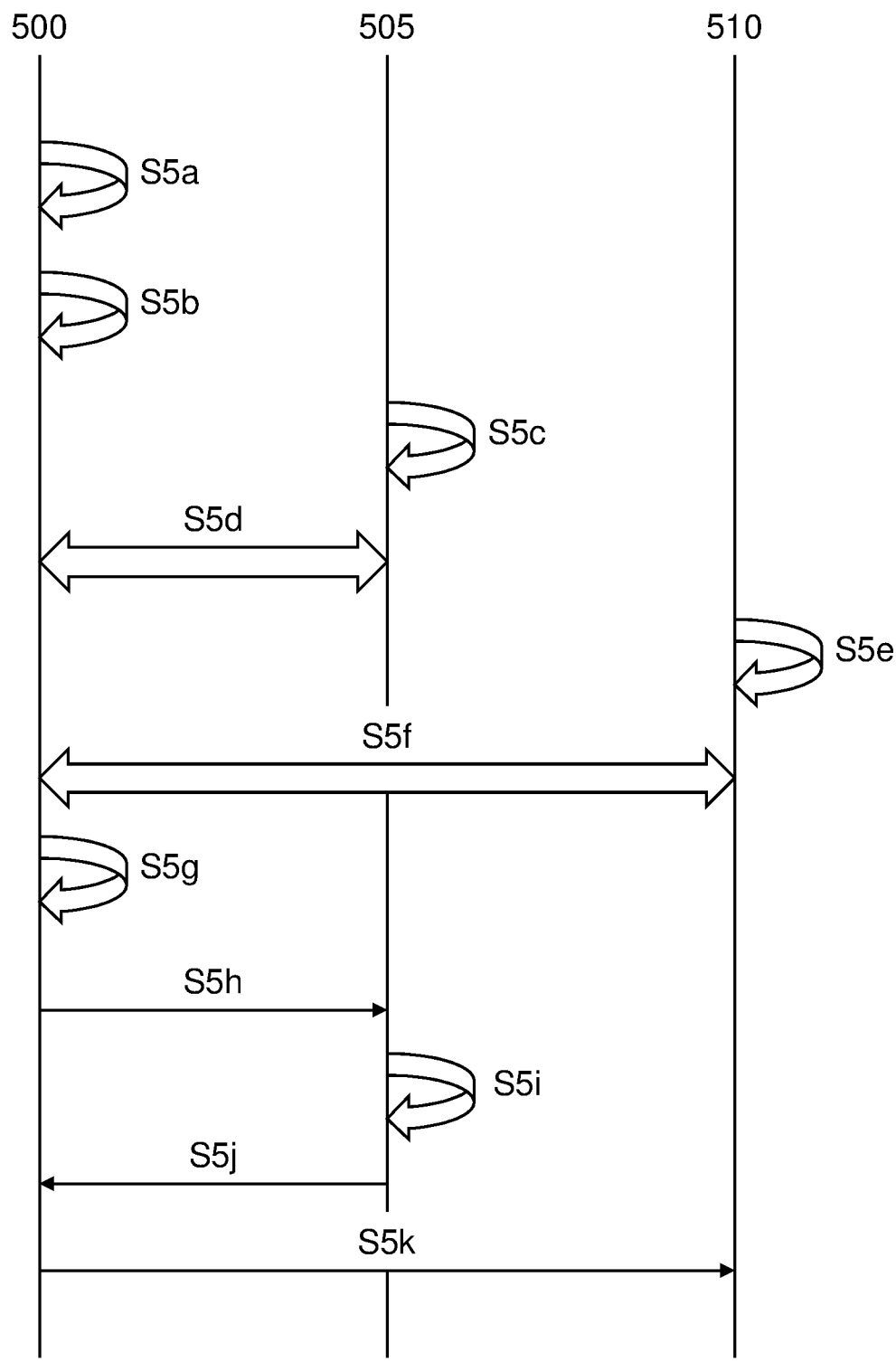
FIG. 5 shows a sequence diagram representing an example of a method of processing user traffic in a virtualised network.

Referring to FIG. 5, an example method of processing user traffic in a virtualised network is shown.

At item S5*a*, a first VNF 500 is instantiated in user space in a host. The first VNF 500 is arranged to process user traffic. The first VNF 500 may comprise UPF functionality and may correspond to the UPF 405 described above with reference to FIG. 4.

At item S5*b*, the first VNF 500 initialises two virtio-user drivers.

At item S5*c*, a second VNF 505 is instantiated m user space in the host. The second VNF 505 is arranged to provide a user plane service (such as a user traffic analytics service, a video compression service, a content-blocking service, etc.) in relation to user traffic processed by the first VNF 300. The second VNF may comprise SF or MEC functionality and may correspond to the SF 410 or MEC 415 described above with reference to FIG. 4. The first and second VNFs 500, 505 are instantiated in the same network namespace as each other in user space in the host. On instantiation, the second VNF binds to the virtio interface created by the first VNF 500 in the network namespace of the second VNF 505.

At item S5*d*, the first VNF 500 is used to establish a point-to-point, shared-memory interface between the first and second VNFs 500, 505, which in this example is a virtio interface. The first and second VNFs 500, 505 both have access to a shared memory region of the host.

At item S5*e*, a third VNF 510 is instantiated in user space in the host. The third VNF 510 is instantiated in the same network namespace as the first and second VNFs 500, 505 in user space in the host. On instantiation, the third VNF 310 binds to the virtio interface created by the first VNF 500 in the network namespace of the third VNF 510. The third VNF 510 may comprise MEC functionality. Alternatively, the third VNF 510 may comprise SF functionality. The second and third VNFs 505, 510 may therefore be comprised in a Service Function Chain (SFC).

At item S5*f*, a further point-to-point, shared-memory interface is established between the first and third VNFs 500, 510, which in this example is a virtio interface.

At item S5*g*, the first VNF 500 is used to classify incoming user traffic. In this regard, the first VNF 500 may comprise Service Function Classifier (SFC) functionality. The first VNF 500 may have received the incoming user traffic as described above with reference to FIG. 4. The user traffic may comprise video traffic. Video traffic is likely to have a relatively high bandwidth. Low-latency handling of video traffic is therefore likely to be particularly effective.

At item S5*h*, in response to the first VNF 500 determining, based on the classifying, that the incoming user traffic is to be subject to the user plane service provided by the second VNF 505, the first VNF 500 transmits the incoming user traffic via the point-to-point, shared-memory interface and enables the second VNF 505 to provide the user plane service in relation to the incoming user traffic. In this regard, the first VNF 500 may place the incoming user traffic into an area of shared memory and pass control data to the second VNF 505 via a control channel between the first and second VNFs 500, 505 to inform the second VNF 505 of the presence of the incoming user traffic. This enables the second VNF 505 to access the incoming user traffic and to provide the user place service in relation thereto. Where the point-to-point, shared-memory interface comprises a vhost-user/virtio interface, the control data may be passed via a Unix socket. This differs from a vhost-net kernel driver, which may implement a control channel using an ioctl interface. At item S5i, the second VNF 505 infers from the presence of the incoming user traffic in the shared memory that the second VNF 505 should apply its user plane service to (be incoming user traffic and provides (be user plane service in relation to the incoming user traffic, which is m the shared memory region.

At item S5j, the second VNF 505 transmits control data to the first VNF 500, the control data relating to the provision of the user plane service in relation to the incoming user traffic at item S5i. The control data of item S5j may, for example, indicate that the second VNF 505 has completed provision of the user plane service in relation to the incoming user traffic.

At item S5j, the first VNF 500 transmits further control data to the third VNF 510. This may inform the third VNF 510 of the presence of the incoming user traffic.

In this example, the first, second and third VNFs 500, 505, 510 are instantiated using a plurality of containers in a single Kubernetes Pod.

As explained above, the first VNF 500 can comprise Service Function Classifier (SFC) functionality.

In examples in which the first, second and third VNFs 500, 505, 510 are instantiated using a plurality of containers in a single Kubernetes Pod, the first VNF 500 may not comprise SFF functionality. This is because, the encapsulating typically performed by an SFF may not be needed where the first, second and third VNFs 500, 505, 510 are implemented in the same Kubernetes Pod as each other. Where the first VNF 500 does not comprise SFF functionality. SFF functionality may nevertheless be provided elsewhere in the virtualised network. In other examples, the first VNF 500 can comprise SFF functionality, for example where the first VNF 500 can invoke a VNF outside the Kubernetes Pod (such that encapsulation may be performed), and/or where the second and/or third VNF 505, 510 is SFC-aware and can decapsulate encapsulated user traffic.

In examples, the first VNF 500 comprises router functionality.

In this example, first, second and third user plane functions 500, 505, 510 are instantiated, at items S5a, S5c and S5e, in the same network namespace as each other in user space in a host and have access to a shared memory region of the host. A first point-to-point, shared-memory interface is established, at item S5d, between the first and second user plane functions 500, 505, and a second point-to-point, shared-memory interface is established, at item S5f, between the first and third user plane functions 500, 510. The first user plane function 500 is used to transmit, at item S5h, first control data, relating to user traffic in the shared memory region, to the second user plane function 505. The first user plane function 500 is also used to transmit, at item S5k, second control data, relating to user traffic in the shared memory region, to the third user plane function 510.

In this example, at item S5b, the first VNF 500 initialises two virtio-user drivers. However, the two virtio-user drivers could be instantiated at different times in other examples.

The above embodiments are to be understood as illustrative examples. Further embodiments are envisaged.

The example host 400 described above with reference to FIG. 4 has a single SF 410. The UPF 405 could, however, provide point-to-point, shared-memory interfaces with multiple SFs, acting as an SFF to a small Service Function Chain (SFC). In some scenarios, only a subset of all SFs in a Service Function Chain (SFC) (for example just one SF in the Service Function Chain (SFC)) is invoked for a given packet, and different SFs may be invoked for different packets based, for example, on a determination made based on classification of the packet.

Example described use virtio for point-to-point, shared-memory interfaces. Memif is an alternative shared-memory-based interface to virtio and may provide comparable performance for point-to-point container communications. For memif, both interfaces need a memif driver to use such an interface. A third-party SF that supports this driver or could quickly integrate it could therefore use memif instead of virtio. Since DPDK provides a memif driver, third-party SFs that use DPDK (which is likely) would have a memif driver. This could make memif a drop-in replacement for virtio. However, memif may be less exposed by some virtualization platforms than virtio.

As an alternative to the arrangements described above, each guest could be bound to an SR-IOV VF on the host. If each of those VFs were associated with the same physical function on the NIC, a fast path could be provided between guests. This would provide similar function to a vSwitch, only using the NIC physical function in place of the vSwitch itself. However, when forwarding a packet from one guest to another, the packet would be at least copied from the memory region of one VF into the memory region of the other VF. This would therefore incur a latency and computation overhead in excess of the point-to-point, shared-memory arranged described above.

The arrangements and techniques described above could in principle be applied to any network in which a series of functions need to be called with minimal time between them, and where it would benefit by them not being tied to a single developer.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The disclosure presented herein also encompasses the subject matter set forth in the following clauses:

Clause 1: A method of processing user traffic in a virtualised network, the method comprising:

instantiating first and second virtualised network functions (VNFs) in the same network namespace as each other in user space in a host, the first VNF being arranged to process user traffic and the second VNF being arranged to provide a user plane service in relation to user traffic processed by the first VNF; and using the first VNF to:
    establish a point-to-point, shared-memory interface between the first and second VNFs, wherein the first and second VNFs both have access to a shared memory region of the host;
    classify incoming user traffic; and
in response to the first VNF determining, based on the classifying, that the incoming user traffic is to be subject to the user plane service provided by the second VNF, store the incoming user traffic in the shared memory region of the host to enable the second VNF to provide the user plane service in relation to the incoming user traffic.

Clause 2: The method of clause 1, wherein the first VNF comprises User Plane Function (UPP) functionality.

Clause 3: The method of any of clauses 1-2, wherein the first VNF comprises Service Function Classifier (SFC) functionality.

Clause 4: The method of any of clauses 1-3, wherein the second VNF comprises ServiceFunction (SF) functionality.

Clause 5: The method of any of clauses 1-4, wherein the user plane service comprises a user traffic analytics service.

Clause 6: The method of any of clauses 1-5, wherein the user plane service comprises a video compression service.

Clause 7: The method of clauses 1-6, wherein the user plane service comprises a content-blocking service.

Clause 8: The method of any of clauses 1-7, wherein the second VNF comprises Mobile Edge Compute (MEC) functionality.

Clause 9: The method of any of clauses 1-8, wherein the point-to-point, shared-memory interface comprises a virtio interface.

Clause 10: The method of any of clauses 1-9, comprising using the first VNF to initialise a virtio-user driver to create a virtio interface in the network namespace of the second VNF.

Clause 11: The method of any of clauses 1-10, wherein the initialising of the virtio-user driver by the first VNF is prior to the instantiation of the second VNF.

Clause 12: The method of any of clauses 1-11, wherein the second VNF binds to the virtio interface.

Clause 13: The method of any of clauses 1-12, comprising:
instantiating a third VNF in said network namespace in user space in the host, the third VNF having access to the shared memory region of the host; and
establishing a further point-to-point, shared-memory interface between the first and third VNFs.

Clause 14: The method of any of clauses 1-13, wherein the third VNF comprises Service Function (SF) functionality.

Clause 15: The method of any of clauses 1-14, wherein the second and third VNFs are comprised in a Service Function Chain (SFC).

Clause 16: The method of any of clauses 1-15, wherein the third VNF comprises Mobile Edge Compute (MEC) functionality.

Clause 17: The method of any of clauses 1-16, wherein the VNPs are instantiated using a plurality of containers in a single Kubernetes Pod.

Clause 18: The method of any of clauses 1-17, wherein the user traffic comprises video traffic.

Clause 19: The method of any of clauses 1-18, comprising using the first VNP to transmit control data to the second VNP to inform the second VNP of the incoming user traffic in the shared memory region of the host.

Clause 20: The method of any of clauses 1-19, wherein the control data is transmitted over a Unix socket.

Clause 21: A method of processing user traffic in a virtualised network, the method comprising:
instantiating first, second and third user plane functions in the same network namespace as each other in user space in a host, the first, second and third user plane functions having access to a shared memory region of the host;
establishing a first point-to-point, shared-memory interface between the first and second user plane functions;
establishing a second point-to-point, shared-memory interface between the first and third user plane functions;
using the first user plane function to transmit first control data, relating to user traffic in the shared memory region, to the second user plane function; and
using the first user plane function to transmit second control data, relating to user traffic in the shared memory region, to the third user plane function.

Clause 22: A method of processing user traffic in a virtualised network, the method comprising:
instantiating a UPP and at least one further network function in the same network namespace as each other in a host, the UPP and the at least one further network function both having access to a shared memory region of the host; and
using the UPP to:
establish at least one virtio interface with the at least one further network function;
process received user traffic;
store the processed, received user traffic in the shared memory region of the host; and
transmit control data associated with the received user traffic to at least one further network function,
wherein the at least one further network function comprises SF and/or MEC functionality.

Clause 23: A virtualised network arranged to perform a method according to any of clauses 1 to 22.

Clause 24: A non-transitory computer-readable medium comprising computer-readable instructions for causing a method of processing user traffic in a virtualised network to be performed, the method being according to any of clauses 1 to 22.

The disclosure presented herein also encompasses the subject matter set forth in the following additional clauses:

Clause 1: A method of processing user plane traffic in a virtualized network instantiating first and second virtualized network functions (VNFs) in a same network namespace in user space in a host of the virtualized network, the first VNF being arranged to process and classify user data packets and matching flows against policy for subsequence application of one or more network service functions to the user data packets, and the second VNF being arranged to provide a user plane service implementing the one or more network service functions in relation to the data packets processed by the first VNF; the method comprising:
establishing, by the first VNF, a point-to-point, shared-memory interface between the first and second VNFs, wherein the first and second VNFs have access to a shared memory region of the host;
classifying, by the first VNF, a first user data packet;
in response to the first VNF determining, based on the classifying, that the first user data packet is to be subject to the user plane service provided by the second VNF, storing the incoming user data packet in the shared memory region of the host; and causing the second VNF to provide the user plane service in relation to the incoming user traffic,
wherein the second VNF is enabled to access the first user data packet stored in the shared memory region to perform the user plane service.

Clause 2: The method of clause 1, wherein the first VNF comprises one of User Plane Function (UPF) functionality or Service Function Classifier (SFC) functionality.

Clause 3: The method of any of clauses 1-2, wherein the second VNF comprises one of Service Function (SF) functionality or Mobile Edge Compute (MEC) functionality.

Clause 4: The method of any of clauses 1-3, wherein the user plane service comprises one of a user traffic analytics service, a video compression service, or a content-blocking service.

Clause 5: The method of any of clauses 1-4, wherein the point-to-point, shared-memory interface comprises a virtio interface.

Clause 6: The method of any of clauses 1-5, further comprising using the first VNF to initialize a virtio-user driver to create a virtio interface in the network namespace of the second VNF.

Clause 7: The method of clauses 1-6, wherein the initializing of the virtio-user driver by the first VNF is prior to the instantiation of the second VNF.

Clause 8: The method of any of clauses 1-7, wherein the second VNF binds to the virtio interface.

Clause 9: The method of any of clauses 1-8, further comprising:
instantiating a third VNF in the network namespace in user space in the host, the third VNF having access to the shared memory region of the host; and
establishing a further point-to-point, shared-memory interface between the first and third VNFs.

Clause 10: The method of any of clauses 1-9, wherein the third VNF comprises Service Function (SF) functionality.

Clause 11: The method of any of clauses 1-10, wherein the second and third VNFs are comprised in a Service Function Chain (SFC).

Clause 12: The method of any of clauses 1-11, wherein the third VNF comprises Mobile Edge Compute (MEC) functionality.

Clause 13: The method of any of clauses 1-12, wherein the VNFs are instantiated using a plurality of containers in a single Kubernetes pod.

Clause 14: The method of any of clauses 1-13, wherein the user traffic comprises video traffic.

Clause 15: The method of any of clauses 1-14, further comprising using the first VNF to transmit control data to the second VNF to inform the second VNF of the incoming user traffic in the shared memory region of the host.

Clause 16: The method of any of clauses 1-15, wherein the control data is transmitted over a Unix socket.

Clause 17: A system for processing user traffic in a virtualized network, the system comprising:
at least one processor; and
at least one memory storing computer-executable instructions that, when executed by the at least one processor, cause the system to perform operations comprising:
instantiating first, second and third user plane functions in a same network namespace in user space in a host, the first, second and third user plane functions having access to a shared memory region of the host;
establishing a first point-to-point, shared-memory interface between the first and second user plane functions;
establishing a second point-to-point, shared-memory interface between the first and third user plane functions;
using the first user plane function to transmit first control data, relating to user traffic in the shared memory region, to the second user plane function; and
using the first user plane function to transmit second control data, relating to user traffic in the shared memory region, to the third user plane function.

Clause 18: The method of clause 17, wherein the third user plane function comprises Service Function (SF) functionality.

Clause 19: The method of any of clauses 17-18, wherein the third user plane function comprises Mobile Edge Compute (MEC) functionality.

Clause 20: A method of processing user traffic in a 5G network, the method comprising:
instantiating a UPF and at least one network function in a same network namespace in a host of the 5G network, the UPF and the at least one network function having access to a shared memory region of the host;
establishing at least one virtio interface with the at least one network function;
processing received user traffic;
storing the processed user traffic in the shared memory region of the host; and
transmitting control data associated with the received user traffic to the at least one further network function,
wherein the at least one network function comprises SF or MEC functionality.

The invention claimed is:

1. A method of processing user plane traffic in a virtualized network instantiating first and second virtualized network functions (VNFs) in a host of the virtualized network, the method comprising:
accessing, by the first VNF, a point-to-point shared-memory interface between the first and second VNFs configured to enable access to a shared memory region of the host by the first and second VNFs, wherein the first VNF is configured to process and classify user data packets and match the user data packets against policies for subsequent application of network service functions to the user data packets, and wherein the second VNF is configured to provide a user plane service applying the network service functions to the data packets processed and classified by the first VNF;
classifying, by the first VNF, a first user data packet;
based on the classifying, determining, by the first VNF, that the first user data packet is to be processed by the user plane service provided by the second VNF;
in response to determining that the first user data packet is to be processed by the user plane service provided by the second VNF, storing, by the first VNF, the first user data packet in the shared memory region of the host via the point-to-point, shared-memory interface; and
causing the second VNF to provide the user plane service, wherein the second VNF is enabled to access, via the point-to-point shared-memory interface, the first user data packet stored in the shared memory region to perform the user plane service, thereby enabling direct access by the second VNF to the first user data packet.

2. The method of claim 1, wherein the first VNF comprises one of User Plane Function (UPF) functionality or Service Function Classifier (SFC) functionality.

3. The method of claim 1, wherein the second VNF comprises one of Service Function (SF) functionality or Mobile Edge Compute (MEC) functionality.

4. The method of claim 1, wherein the user plane service comprises one of a user traffic analytics service, a video compression service, or a content-blocking service.

5. The method of claim 1, wherein the point-to-point, shared-memory interface comprises a virtio interface.

6. The method of claim 1, further comprising using the first VNF to initialize a virtio-user driver to create a virtio interface in a network namespace of the second VNF.

7. The method of claim 6, wherein the initializing of the virtio-user driver by the first VNF is prior to the instantiation of the second VNF.

8. The method of claim 7, wherein the second VNF binds to the virtio interface.

9. The method of claim 1, further comprising:
instantiating a third VNF in a network namespace in user space in the host, the third VNF having access to the shared memory region of the host; and
establishing a further point-to-point, shared-memory interface between the first and third VNFs.

10. The method of claim 9, wherein the third VNF comprises Service Function (SF) functionality.

11. The method of claim 9, wherein the second and third VNFs are comprised in a Service Function Chain (SFC).

12. The method of claim 9, wherein the third VNF comprises Mobile Edge Compute (MEC) functionality.

13. The method of claim 1, wherein the VNFs are instantiated using a plurality of containers in a single Kubernetes pod.

14. The method of claim 1, wherein the user traffic comprises video traffic.

15. The method of claim 1, further comprising using the first VNF to transmit control data to the second VNF to inform the second VNF of incoming user traffic in the shared memory region of the host.

16. The method of claim 15, wherein the control data is transmitted over a Unix socket.

17. A method of processing user traffic in a 5G network, the method comprising:
- instantiating a UPF and a first network function in a same network namespace in a host of the 5G network, the UPF and the first network function having access to a shared memory region of the host, wherein the first network function is configured to process and classify the user traffic and match the user traffic against policies for subsequent application of network functions to the user traffic;
- processing, by the first network function, the user traffic;
- storing the processed user traffic in the shared memory region of the host; and
- transmitting control data associated with the processed user traffic to a second network function, wherein the second network function is enabled to access, via the shared memory region of the host, the processed user traffic stored in the shared memory region to perform a user plane service, thereby enabling access to the processed user traffic without the first network function forwarding the processed user traffic to the second network function;
- wherein the first or second network function comprises SF or MEC functionality.

18. A system for processing user plane traffic in a 5G network instantiating first and second virtualized network functions (VNFs) in a host of the 5G network, the system comprising:
- at least one processor; and
- at least one memory storing computer-executable instructions that, when executed by the at least one processor, cause the system to perform operations comprising:
  - accessing, by the first VNF, a point-to-point shared-memory interface between the first and second VNFs configured to enable access to a shared memory region of the host by the first and second VNFs, wherein the first VNF is configured to process and classify user data packets and match the user data packets against policies for subsequent application of network service functions to the user data packets, and wherein the second VNF is configured to provide a user plane service applying the network service functions to the data packets processed and classified by the first VNF;
  - classifying, by the first VNF, a first user data packet;
  - based on the classifying, determining, by the first VNF, that the first user data packet is to be processed by the user plane service provided by the second VNF;
  - in response to determining that the first user data packet is to be processed by the user plane service provided by the second VNF, storing, by the first VNF, the first user data packet in the shared memory region of the host via the point-to-point, shared-memory interface; and
  - causing the second VNF to provide the user plane service, wherein the second VNF is enabled to access, via the point-to-point shared-memory interface, the first user data packet stored in the shared memory region to perform the user plane service, thereby enabling direct access by the second VNF to the first user data packet.

19. The system of claim 18, wherein the first VNF comprises one of User Plane Function (UPF) functionality or Service Function Classifier (SFC) functionality.

20. The system of claim 18, wherein the second VNF comprises one of Service Function (SF) functionality or Mobile Edge Compute (MEC) functionality.

\* \* \* \* \*